US008194021B2

(12) United States Patent
Liao et al.

(10) Patent No.: US 8,194,021 B2
(45) Date of Patent: Jun. 5, 2012

(54) DISPLAY APPARATUS, PIXEL STRUCTURE AND DRIVING METHOD THEREOF

(75) Inventors: Pei-Chun Liao, Hsinchu (TW); Hung-Lung Hou, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 971 days.

(21) Appl. No.: 12/188,577

(22) Filed: Aug. 8, 2008

(65) Prior Publication Data

US 2009/0295695 A1 Dec. 3, 2009

(30) Foreign Application Priority Data

Jun. 2, 2008 (TW) .............................. 97120491 A

(51) Int. Cl.
*G09G 3/36* (2006.01)
*G02F 1/136* (2006.01)

(52) U.S. Cl. .............. 345/92; 345/87; 345/204; 349/43; 349/38; 349/39; 349/46

(58) Field of Classification Search ..................... 345/92
See application file for complete search history.

(56) References Cited

U.S. PATENT DOCUMENTS 6,191,831 B1 * 2/2001 Kim et al. ....................... 349/43
6,999,053 B2 * 2/2006 Lee et al. ........................ 345/92
6,999,134 B2 * 2/2006 Lee et al. ........................ 349/38
7,256,861 B2 8/2007 Park et al.
7,548,285 B2 * 6/2009 Su et al. .......................... 349/48
7,796,104 B2 * 9/2010 Kim ................................ 345/87
7,936,344 B2 * 5/2011 Shih .............................. 345/204
7,969,396 B2 * 6/2011 Kim ................................ 345/87
2003/0169223 A1 * 9/2003 Lee et al. ........................ 345/92
2006/0231838 A1 * 10/2006 Kim ................................ 257/59
2007/0153146 A1 7/2007 Shih
2008/0042949 A1 * 2/2008 Chen et al. ...................... 345/87
2009/0002583 A1 * 1/2009 You et al. ........................ 349/38
2009/0279007 A1 * 11/2009 Shih et al. ....................... 349/37
2010/0328198 A1 * 12/2010 Tsubata .......................... 345/87

* cited by examiner

*Primary Examiner* — Abbas Abdulselam
*Assistant Examiner* — Sarvesh J Nadkarni
(74) *Attorney, Agent, or Firm* — Thomas, Kayden, Horstemeyer & Risley, LLP

(57) ABSTRACT

A display apparatus, pixel structure and drive method thereof are provided. The display apparatus comprises a gate drive chip, a first gate line, a second gate line, a first pixel unit, and a second pixel unit. The gate driver is configured to generate a first gate drive signal and a second gate drive signal. The first and second gate drive signals are outputted to the first and second gate lines, respectively. Furthermore, the first and second gate drive signals are configured to adjust a first feed through (FT) voltage generated by a first pixel area of the first pixel unit, a second FT voltage generated by a second pixel area of the first pixel unit, a third FT voltage generated by a third pixel area of the second pixel unit, and a fourth FT voltage generated by a fourth pixel area of the second pixel unit.

21 Claims, 5 Drawing Sheets

DISPLAY APPARATUS, PIXEL STRUCTURE AND DRIVING METHOD THEREOF

This application claims the benefit of priority based on Taiwan Patent Application No. 097120491 filed on Jun. 2, 2008, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a display apparatus, a pixel structure and a drive method thereof. More particularly, the present invention relates to a display apparatus, a pixel structure and a drive method thereof for lower color washout.

2. Descriptions of the Related Art

With the advancement of science and technology, various electronic products have become indispensable. Displays play an important role in multimedia electronic products. Among various displays, liquid crystal displays (LCDs), which have low power consumption, a small volume, small space occupation, flat square panel, high definition, stable picture quality and are radiation-free, have gradually replaced conventional cathode ray tube (CRT) displays and found a wide application in many electronic products such as mobile phones, screens, digital televisions and notebook computers.

When a user views a conventional LCD at different viewing angles, different directions of brightness will be perceived by the user's naked eyes due to different phase differences at different viewing angles. Furthermore, the gray scale inversion may be observed by the user.

To overcome these problems, a variety of technologies aimed to increase the range of viewing angles have been developed in the art to prevent the gray scale inversion in conventional LCDs. One of these technologies is known as the multi-domain vertical alignment (MVA) technology, in which the liquid crystal material in the LCD is divided into multiple alignment domains and are aligned complementary to each other. Thus, the user will observe a same phase difference at different viewing angles, thus increasing the range of the viewing angles to prevent gray scale inversion.

However, despite the high contrast ratio and wide viewing angles, the MVA technology also has some shortcomings, one of which is that the color may be washed out when viewing the LCD adopting the MVA technology at large viewing angles. Color washout is caused by the difference in the transmittance of the liquid crystal molecules at different feed voltages when the user views the display panel at different viewing angles. Consequently, the particular color originally perceived by the naked eyes will wash out as the viewing angle increases.

In summary, although the MVA technology delivers a high contrast ratio and a wide range of viewing angles which remarkably improve the users' experience of using such LCDs, washout at large viewing angles has been a great challenge. Lower color washout is necessary for LCDs to be competitive in the large-sized display panel market. As a result, it is important to prevent washout at large viewing angles.

SUMMARY OF THE INVENTION

One objective of this invention is to provide a pixel structure for a display apparatus having a gate drive chip. The pixel structure comprises a first gate line, a second gate line and a pixel unit. The first gate line is configured to receive a first gate drive signal generated by the gate drive chip. The second gate line is configured to receive a second gate drive signal generated by the gate drive chip. The pixel unit has a first pixel area and a second pixel area. The first pixel area is operatively coupled to the first gate line via a first capacitance and a first thin film transistor (TFT), and is configured to generate a first feed through (FT) voltage. The second pixel area is operatively coupled to the first and the second gate lines via a second TFT and a second capacitance respectively, and is configured to generate a second FT voltage. The first and the second FT voltages are adjusted to be different values according to the first and the second gate drive signals.

Another objective of this invention is to provide a drive method for the pixel structure described above. The drive method of this invention comprises the following steps: enabling the first gate line according to the first gate drive signal when the display apparatus displays a first frame of an image, so that the first FT voltage is larger than the second FT voltage; and enabling the first and the second gate lines at the same time according to the first and the second gate drive signals when the display apparatus displays a second frame of the image, so that the second FT voltage is larger than the first FT voltage.

Yet a further objective of this invention is to provide a display apparatus, comprising a gate drive chip, a first gate line, a second gate line, a first pixel unit and a second pixel unit. The first pixel unit has a first pixel area and a second pixel area, the second pixel unit has a third pixel area and a fourth pixel area. The first pixel area of the first pixel unit is operatively coupled to the first gate line via a first capacitance and a first TFT, and is configured to generate a first FT voltage; the second pixel area of the first pixel unit is operatively coupled to the first and the second gate lines via a second TFT and a second capacitance respectively, and is configured to generate a second FT voltage. The first third pixel area of the second pixel unit is operatively coupled to the first and the second gate lines via a third TFT and a third capacitance respectively, and is configured to generate a third FT voltage; the fourth pixel area of the second pixel unit is operatively coupled to the first gate line via a fourth capacitance and a fourth TFT, and is configured to generate a fourth voltage. The first and the second FT voltages are adjusted to be different values according to the first and the second gate drive signals, and the third and the fourth FT voltages are adjusted to be different values according to the same.

Yet another objective of this invention is to provide a drive method for the display apparatus described above. The drive method of this invention comprises the following steps: enabling the first gate line according to the first gate drive signal when the display apparatus displays a first frame of an image, so that the first FT voltage is larger than the second FT voltage, and the fourth FT voltage is larger than the third FT voltage; enabling the first and the second gate lines at the same time according to the first and the second gate drive signals when the display apparatus displays a second frame of the image, so that the second FT voltage is larger than the first FT voltage, and the third FT voltage is larger than the fourth FT voltage.

This invention provides two FT voltages of different values in a single pixel unit without adding gate lines and data lines in the display apparatus. In other words, this invention can provide two FT voltages of different values in a single pixel by simply using the original number of gate lines and data lines in the display apparatus. In this way, washout at large viewing angles is addressed successfully, and since no additional gate lines and data lines are needed, the aperture ratio of the display apparatus remains unchanged instead of being decreased.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, this invention will be explained with reference to the embodiments thereof. However, these embodiments are not intended to limit this invention to any specific environment, applications or particular implementations described in these embodiments. Therefore, description of these embodiments is only intended to illustrate rather than to limit this invention. It should be appreciated that in the following embodiments and the attached drawings, elements not related directly to this invention are omitted from depiction.

Figure 1:
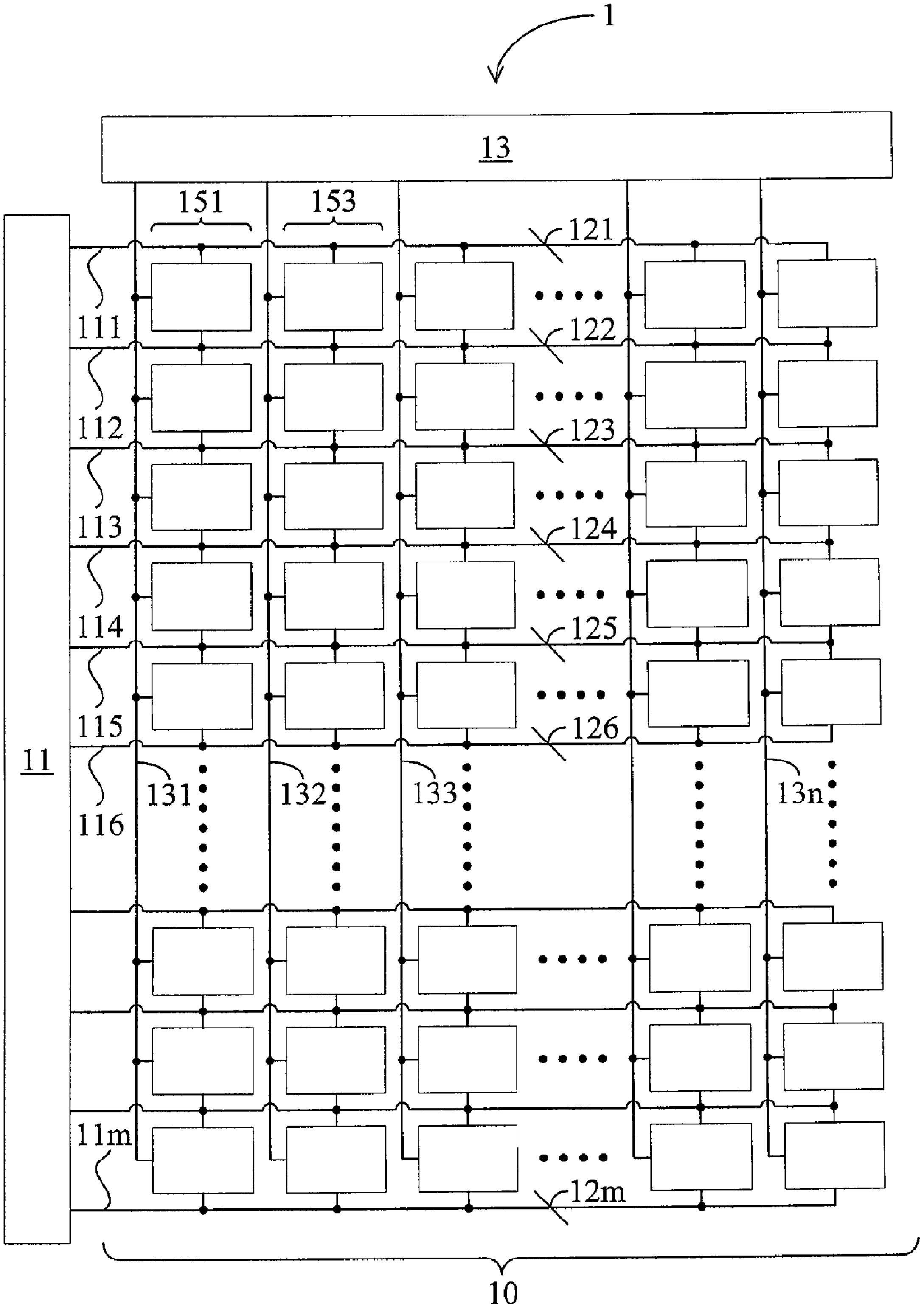
FIG. 1 is a schematic view illustrating a display apparatus of the present invention.

FIG. 1 is a schematic view of a preferred embodiment of a display apparatus of this invention. The display apparatus 1 may be one of the following flat panel displays: an organic light-emitting diode display (OLED), a plasma display panel (PDP), a liquid crystal display (LCD) or a field emission display (FED). In this embodiment, the display apparatus 1 is an LCD employing a dot inversion drive method. The display apparatus 1 comprises a display panel 10, a gate drive chip 11, a source drive chip 13, m gate lines 111, 112, . . . , 11*m* parallel to each other, and n data lines 131, 132, . . . , 13*n* parallel to each other, wherein both m and n are positive integers. The display panel 10 comprises a plurality of pixel units, and for purpose of simplicity, only a first pixel unit 151 and a second pixel unit 153 are denoted in this embodiment. The source drive chip 11 is electrically connected to the gate lines 111, 112, . . . , 11*m* to provide a plurality of gate drive signals 121, 122, . . . , 12*m* for enabling the gate lines 111, 112, . . . , 11*m* respectively. The source drive chip 13 is electrically connected to the data lines 131, 132, . . . , 13*n* to provide a plurality of data signals (not shown) to the data lines 131, 132, . . . , 13*n*.

Figure 2:
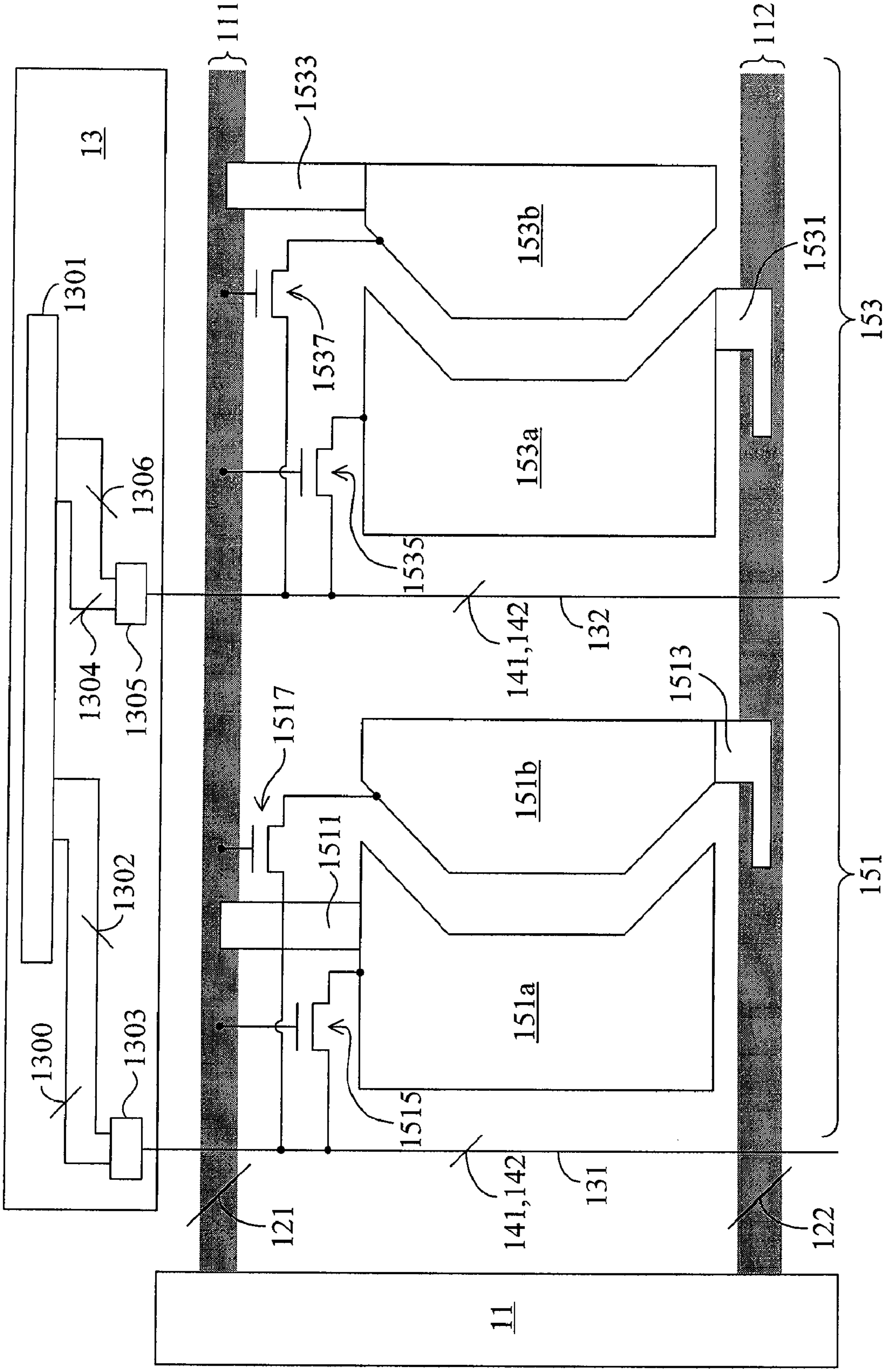
FIG. 2 is a schematic view illustrating two pixel units in the display apparatus of the present invention.

FIG. 2 is a schematic view illustrating connections among the first and second pixel units, as well as the gate drive chip and the source drive chip according to the embodiment of this invention. Hereinafter, the operations and functions of the first and the second pixel units in the display apparatus of this invention will be described in detail with reference to FIG. 2. Here, for purpose of simplicity, only the first gate line 111, the second gate line 112, the first data line 131 and the second data line 132 are depicted in FIG. 2 to represent the m gate lines and the n data lines of the display apparatus 1. Likewise, in FIG. 2, only the first gate drive signal 121, the second gate drive signal 122, a first polarity data signal 141 and a second polarity data signal 142 are depicted to represent a plurality of gate drive signals and a plurality of polarity data signals in the display apparatus 1.

The first pixel unit 151 comprises a first pixel area 151*a*, a second pixel area 151*b*, a first capacitance 1511, a second capacitance 1513, a first thin film transistor (TFT) 1515 and a second TFT 1517. The first capacitance 1511 is composed of the first gate line 111 and an electrode (not shown) of the first pixel unit 151. The second capacitance 1513 is composed of the second gate line 112 and the electrode of the first pixel unit 151. The first pixel area 151*a* of the first pixel unit 151 is coupled to the first gate line 111 via the first capacitance 1511, and also coupled to the first gate line 111 and the first data line 131 via the first TFT 1515. The second pixel area 151*b* of the first pixel unit 151 is coupled to the second gate line 112 via the second capacitance 1513, and also coupled to the first gate line 111 and the first data line 131 via the second TFT 1517.

Likewise, the second pixel unit 153 comprises a third pixel area 153*a*, a fourth pixel area 153*b*, a third capacitance 1531, a fourth capacitance 1533, a third TFT 1535 and a fourth TFT 1537. The third capacitance 1531 is composed of the second gate line 112 and an electrode (not shown) of the second pixel unit 153. The fourth capacitance 1533 is composed of the first gate line 111 and the electrode of the second pixel unit 153. The third pixel area 153*a* of the second pixel unit 153 is coupled to the second gate line 112 via the third capacitance 1531, and also coupled to the first gate line 111 and the second data line 132 via the third TFT 1535. The fourth pixel area 153*b* of the second pixel unit 153 is coupled to the first gate line 111 via the fourth capacitance 1533, and also coupled to the first gate line 111 and the second data line 132 via the fourth TFT 1537.

Each of the first capacitance 1511, the second capacitance 1513, the third capacitance 1531 and the fourth capacitance 1533 has a capacitance value, in which the capacitance value of the first capacitance 1511 is less than that of the second capacitance 1513, and the capacitance value of the fourth capacitance 1533 is less than that of the third capacitance 1531.

The source drive chip 13 comprises a gamma value storage unit 1301, a first switch unit 1303 and a second switch unit 1305. The gamma value storage unit 1301 is configured to store a first positive polarity gamma value 1300, a first negative polarity gamma value 1302, a second positive polarity gamma value 1304 and a second negative gamma value 1306. It should be noted that, although two buses shown in FIG. 2 transmit the first positive polarity gamma value 1300 and the first negative polarity gamma value 1302 separately, this invention is not limited to transmission of these two values via separate buses. More particularly, the gamma value storage unit 1301 can be designed to transmit the first positive polarity gamma value 1300 and the first negative polarity gamma value 1302 respectively with a "positive level" and a "negative level" of a voltage via a bus. In other words, the first positive polarity gamma value 1300 can be represented by the positive level of the voltage, while the first negative polarity gamma value 1302 be represented by the negative level of the same voltage, thus to indicate these two polarity gamma values via a single bus.

In the same way, the second positive polarity gamma value 1304 and the second negative gamma value 1306 can be indicated via another single bus. Based on the above description, those of ordinary skill in the art will realize how to transmit the second positive polarity gamma value 1304 and the second negative gamma value 1306 via a single bus, and thus this will not be further described herein.

Since the display apparatus 1 of this embodiment is an LCD adopting a dot inversion drive method, the first polarity data signal 141 and the second polarity data signal 142 are outputted to the first data line 131 and the second data line 132 alternately. Also, since the display panel 10 has two kinds of pixel units with different pixel structures (i.e., the first pixel unit 151 and the second pixel unit 153) which receive the first polarity data signal 141 and the second polarity data signal 142 alternately through the first data line 131 and the second data line 132, the gamma value storage unit 1301 outputs the first positive polarity gamma value 1300, the first negative polarity gamma value 1302, the second positive polarity gamma value 1304 and the second negative gamma value 1306 to endow the first pixel unit 151 and the second pixel unit 153 with identical and optimized display performance.

When the display apparatus 1 displays a first frame of an image, the first data line 131 receives the first polarity data signal 141 with the first positive polarity gamma value 1300 via the first switch unit 1303. Simultaneously, the second data line 132 receives the second polarity data signal 142 with the second negative gamma value 1306 via the second switch unit 1305. On the other hand, when the display apparatus 1 displays a second frame of the image, the first data line 131 receives the second polarity data signal 142 with the first negative polarity gamma value 1302 via the first switch unit 1303. Simultaneously, the second data line 132 receives the first polarity data signal 141 with the second positive gamma value 1304 via the second switch unit 1304.

In a preferred embodiment, the first polarity data signal 141 and the second polarity data signal 142 have mutually opposite phases; i.e., if the first polarity data signal 141 is of a positive polarity, the second polarity data signal 142 is of a negative polarity, or if the first polarity data signal 141 is of a negative polarity, the second polarity data signal 142 is of a positive polarity. Based on the above description, those of ordinary skill in the art will realize how to switch the first positive polarity gamma value 1300, the first negative polarity gamma value 1302, the second positive polarity gamma value 1304 and the second negative gamma value 1306, and thus this will not be further described herein.

Figure 3A:
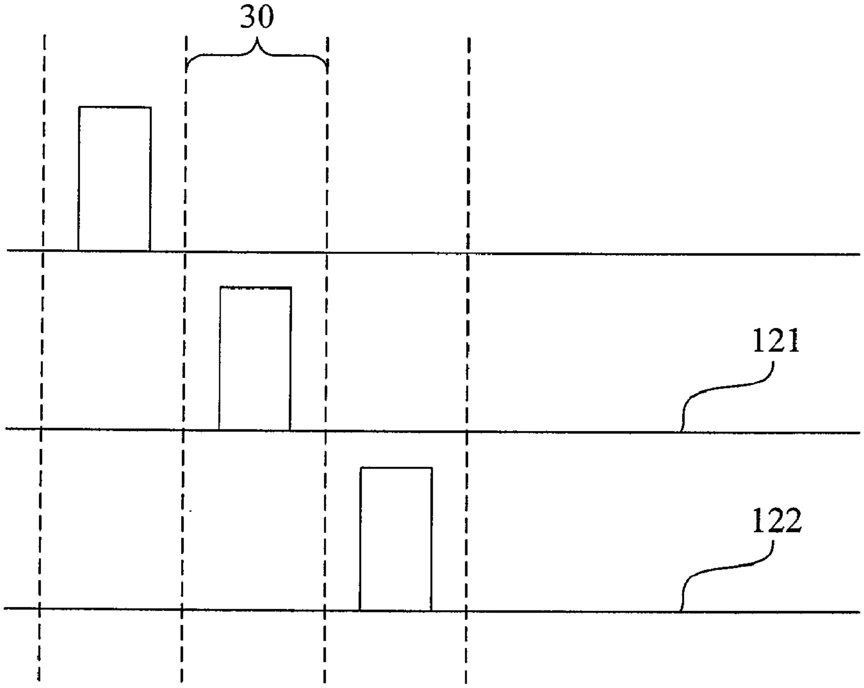
FIG. 3A is a waveform diagram illustrating gate drive signals for displaying a first frame.

As described above, when the display apparatus 1 displays the first frame of the image, the gate drive chip 11 outputs the first gate drive signal 121 and the second gate drive signal 122 as depicted in FIG. 3A. At this point, the first pixel unit 151 receives the first polarity data signal 141 with the first positive polarity gamma value 1300 through the first data line 131. Simultaneously, the second pixel unit 153 receives the second polarity data signal 142 with the second negative polarity gamma value 1306 through the second data line 132.

Figure 4B:
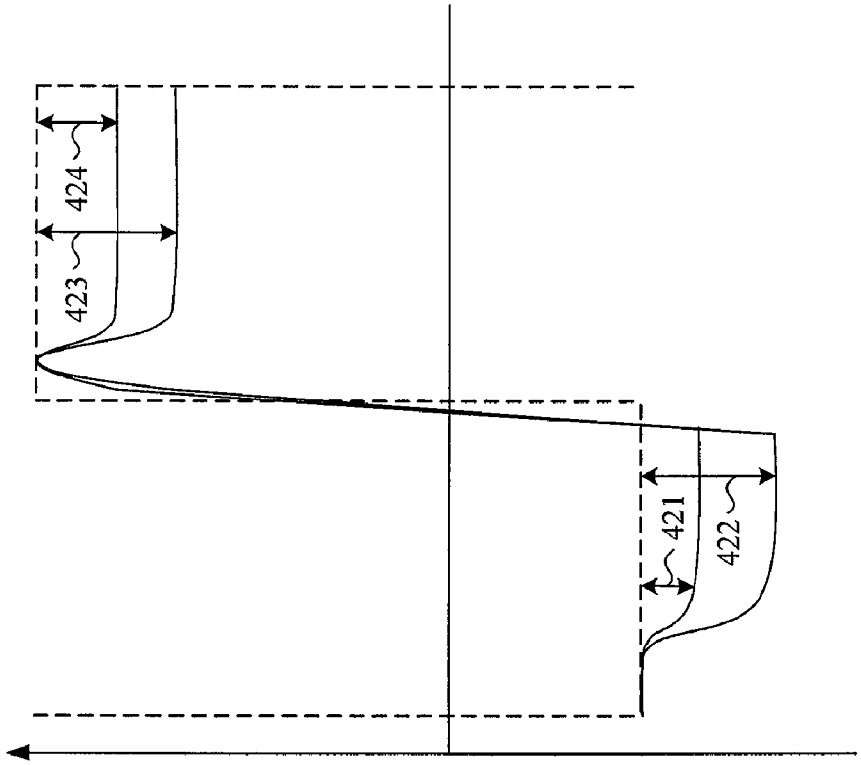
FIG. 4B is a waveform diagram illustrating a voltage of the second pixel unit.
Figure 4A:
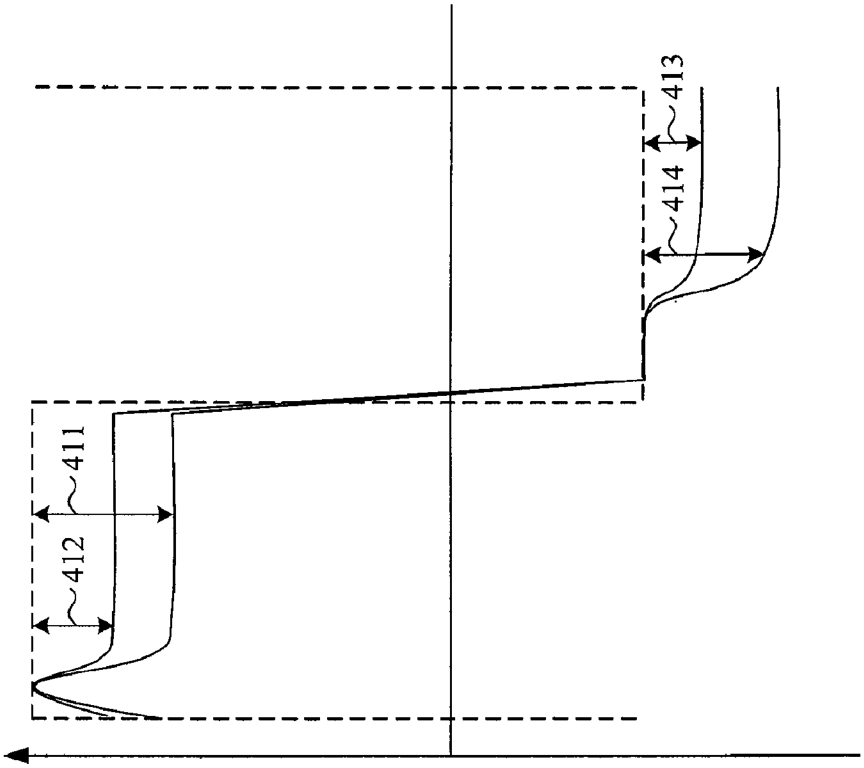
FIG. 4A is a waveform diagram illustrating a voltage of the first pixel unit.

FIG. 4A depicts a schematic voltage waveform diagram of the first pixel unit 151 when the display apparatus 1 displays the first frame and the second frame of the image, while FIG. 4B depicts a schematic voltage waveform diagram of the second pixel unit 153 when the display apparatus 1 displays the first frame and the second frame. During the time period 30, the first gate drive signal 121 enables the first TFT 1515, the second TFT 1517, the third TFT 1535 and the fourth TFT 1537 at the same time. At this point, the first pixel area 151*a* of the first pixel unit 151 is charged by the first data line 131 via the first TFT 1515. At the same time, the first capacitance 1511 coupled to the first pixel area 151*a* of the first pixel unit 151 and the first gate line 111 will cause a corresponding variation of the internal voltage of the first pixel area 151*a* because of the variation of the first gate drive signal 121.

Accordingly, the first pixel area 151*a* of the first pixel unit 151 generates a first FT voltage 411. The second pixel area 151*b* of the first pixel unit 151 is charged by the first data line 131 via the second TFT 1517 to generate a second FT voltage 412 in the second pixel area 151*b*.

Similarly, when the display apparatus 1 displays the first frame of the image, the third pixel area 153*a* of the second pixel unit 153 is charged by the second data line 132 via the third TFT 1535 to generate a third FT voltage 421 in the third pixel area 153*a*. The fourth pixel area 153*b* of the second pixel unit 153 is charged by the second data line 132 via the fourth TFT 1537. Simultaneously, because of the variation of the first gate drive signal 121, the fourth capacitance 1533 coupled to the fourth pixel area 153*b* of the second pixel unit 153 and the first gate line 111 will cause a corresponding variation of the internal voltage of the fourth pixel area 153*b*. Accordingly, the fourth pixel area 153*b* of the second pixel unit 153 generates a fourth FT voltage 422.

When the display apparatus 1 displays the first frame of the image, the first pixel area 151*a* of the first pixel unit 151 is charged via the first TFT 1515. Simultaneously, because of the variation of the first gate drive signal 121, the first capacitance 1511 coupled to the first pixel area 151*a* of the first pixel unit 151 and the first gate line 111 will cause a corresponding variation of the internal voltage of the first pixel area 151*a*. On the other hand, the second pixel area 151*b* is charged only via the second TFT 1517. Hence, the first FT voltage 411 of the first pixel unit 151 is higher than the second FT voltage 412. Likewise, the fourth pixel area 153*b* of the second pixel unit 153 is charged via the fourth TFT 1537. At the same time, the fourth capacitance 1533 coupled to the fourth pixel area 153*b* of the second pixel unit 153 and the first gate line 111 will cause a corresponding variation of the internal voltage of the fourth pixel area 153*b* and simultaneously, because of the variation of the first gate drive signal 121. On the other hand, the third pixel area 153*a* is charged only via the third TFT 1535. Hence, the fourth FT voltage 422 of the second pixel unit 153 is higher than the third FT voltage 421.

Figure 3B:
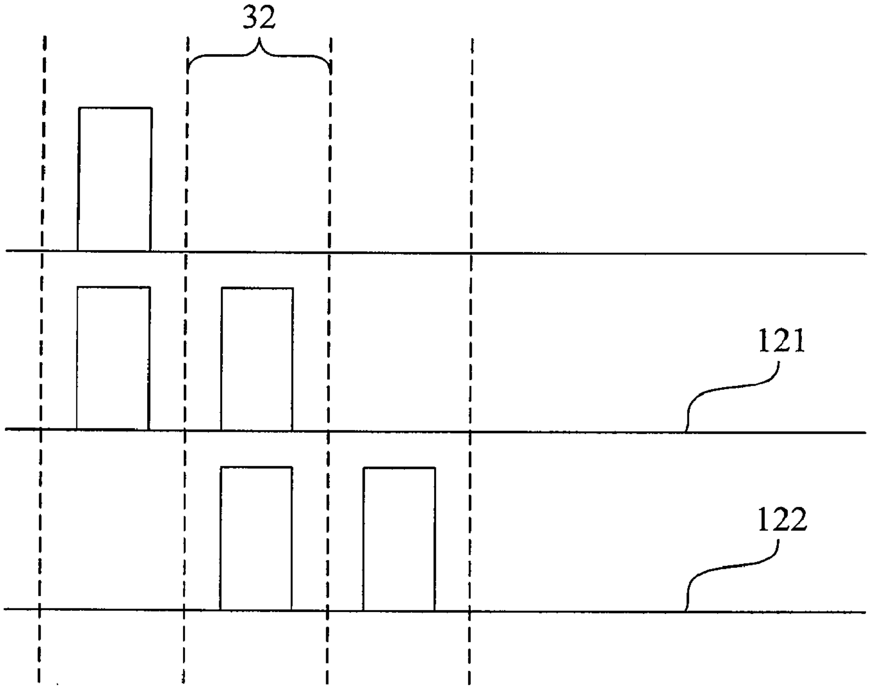
FIG. 3B is a waveform diagram illustrating gate drive signals for displaying a second frame.

When the display apparatus 1 displays the second frame of the image, the gate drive chip 11 outputs the first gate drive signal 121 and the second gate drive signal 122 as depicted in FIG. 3B. At this point, the first pixel unit 151 receives the second polarity data signal 142 with the first negative polarity gamma value 1302 through the first data line 131. At the same time, the second pixel unit 153 receives the first polarity data signal 141 with the second positive polarity gamma value 1304 through the second data line 132. During the time period 32, the first gate drive signal 121 enables the first TFT 1515, the second TFT 1517, the third TFT 1535 and the fourth TFT 1537. At this point, the first pixel area 151*a* of the first pixel unit 151 is charged by the first data line 131 via the first TFT 1515. Meanwhile, the first capacitance 1511 coupled to the first pixel area 151*a* of the first pixel unit 151 and the first gate line 111 will cause a corresponding variation of the internal voltage of the first pixel area 151*a* because of the variation of the first gate drive signal 121.

Accordingly, the first pixel area 151*a* of the first pixel unit 151 generates another first FT voltage 413. The second pixel area 151*b* of the first pixel unit 151 is charged by the first data line 131 via the second TFT 1517. At the same time, the second capacitance 1513 coupled to the second pixel area 151*b* of the first pixel unit 151 and the second gate line 112 will cause a corresponding variation of the internal voltage of the second pixel area 151*b* because of the variation of the second gate drive signal 122. Accordingly, the second pixel area 151*b* of the first pixel unit 151 generates another second FT voltage 414.

Similarly, when the display apparatus 1 displays the second frame of the image, the third pixel area 153*a* of the second pixel unit 153 is charged by the second data line 132 via the third TFT 1535. At the same time, because of the variation of the second gate drive signal 122, the third capacitance 1531 coupled to the third pixel area 153*a* of the second pixel unit 153 and the second gate line 112 will cause a corresponding variation of the internal voltage of the first third pixel area 153*a*. Accordingly, the third pixel area 153*a* of the second pixel unit 153 generates another third FT voltage 423. On the other hand, the fourth pixel area 153*b* of the second pixel unit 153 is charged by the second data line 132 via the fourth TFT 1537. At the same time, because of the variation of the first gate drive signal 121, the fourth capacitance 1533 coupled to the fourth pixel area 153*b* of the second pixel unit 153 and the first gate line 111 will cause a corresponding variation of the internal voltage of the fourth pixel area 153*b*. Accordingly, the fourth pixel area 153*b* of the second pixel unit 153 generates another fourth FT voltage 424.

When the display apparatus 1 displays the second frame of the image, the first pixel area 151*a* of the first pixel unit 151 is charged via the first TFT 1515. At the same time, the first capacitance 1511 coupled to the first pixel area 151*a* of the first pixel unit 151 and the first gate line 111 will cause a corresponding variation of the internal voltage of the first pixel area 151*a* because of the variation of the first gate drive signal 121. On the other hand, the second pixel area 151*b* is also charged via the second TFT 1517. Likewise, the second capacitance 1513 coupled to the second pixel area 151*b* of the first pixel unit 151 and the second gate line 112 will cause a corresponding variation of the internal voltage of the second pixel area 151*b* because of the variation of the second gate drive signal 122. Since the first capacitance 1511 has a capacitance value less than that of the second capacitance 1513, the second FT voltage 422 of the first pixel unit 151 is higher than the first FT voltage 421.

Furthermore, the fourth pixel area 153*b* of the second pixel unit 153 is charged via the fourth TFT 1537. Simultaneously, the fourth capacitance 1533 coupled to the fourth pixel area 153*b* of the second pixel unit 153 and the first gate line 111 will cause a corresponding variation of the internal voltage of the fourth pixel area 153*b* because of the variation of the first gate drive signal 121. On the other hand, the third pixel area 153*a* is also charged via the third TFT 1535. Likewise, the third capacitance 1531 coupled to the third pixel area 153*a* of the second pixel unit 153 and the second gate line 112 will cause a corresponding variation of the internal voltage of the third pixel area 153*a* because of the variation of the second gate drive signal 122. Since the fourth capacitance 1533 has a capacitance less than that of the third capacitance 1531, the third FT voltage 423 of the second pixel unit 153 is higher than the fourth FT voltage 424.

Although this embodiment only describes the operations and functions of the first pixel unit 151 and the second pixel unit 153 in the context of the dot inversion drive method, this invention is not limited to use for an LCD adopting the dot inversion drive method. Instead, based on the above descriptions, those of ordinary skill in the art will realize operations and functions of the first pixel unit 151 and the second pixel unit 153 when a column inversion drive method or other drive methods are adopted. Thus, this will not be further described herein.

Figure 5:
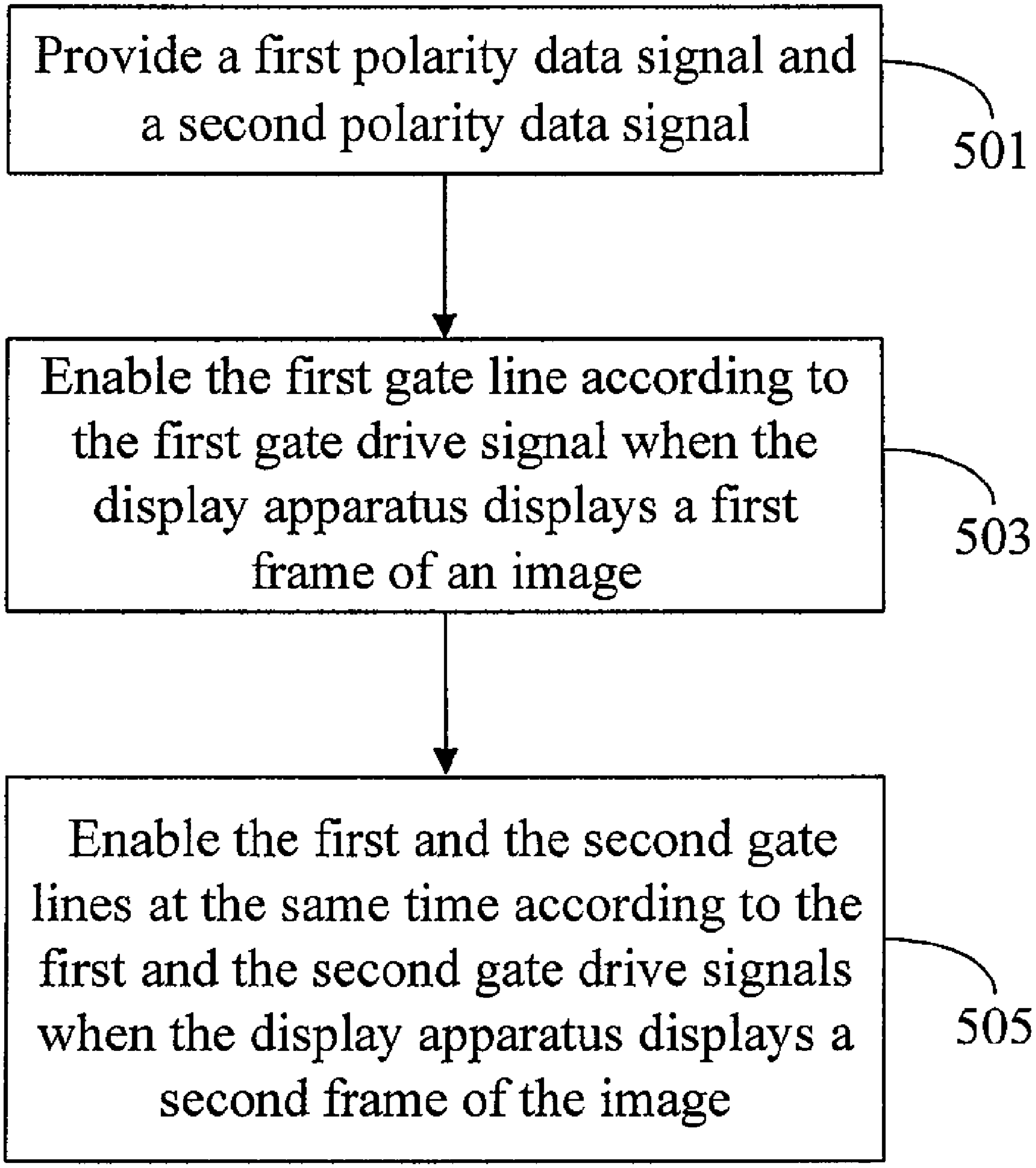
FIG. 5 is a flow chart illustrating a drive method for use in the display apparatus of the present invention.

A process flow of driving the display apparatus 1 described above is depicted in FIG. 5. Initially in step 501, a first polarity data signal and a second polarity data signal are provided. Then, in step 503, a first gate line is enabled according to the first gate drive signal when the display apparatus displays a first frame of an image, so that the first FT voltage is higher than the second FT voltage, and the fourth FT voltage is higher than the third FT voltage. Finally in step 505, the first and the second gate lines are enabled at the same time according to the first and the second gate drive signals when the display apparatus displays a second frame of the image, so that the second FT voltage is higher than the first FT voltage and the third FT voltage is higher than the fourth FT voltage.

Since the display apparatus 1 is an LCD adopting the dot inversion drive method, the first and the second polarity data signals provided in step 501 are outputted alternately, so that the first and the second frames of the image will be displayed according to the first and the second polarity data signals.

In addition to the steps described above, the process flow of driving the display apparatus is also capable of performing all the operations or functions recited in the display apparatus 1 previously described. Those of ordinary skill in the art can straightforwardly realize how the process flow depicted in FIG. 5 performs these operations and functions based on the above descriptions of the display apparatus 1. Therefore, this will not be further described herein.

In summary, the display apparatus disclosed in this invention can provide two FT voltages of different values in a single pixel unit without adding gate lines and data lines. In other words, the display apparatus disclosed in this invention can provide two FT voltages of different values in a single pixel by simply using the original number of gate lines and data lines. In this way, color washout at large viewing angles in conventional LCDs is eliminated. In addition, because no additional gate lines and additional data lines are needed, the aperture ratio of the display apparatus remains unchanged instead of being decreased.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A pixel structure for a display apparatus having a gate drive chip, the pixel structure comprising:

a first gate line being configured to receive a first gate drive signal generated by the gate drive chip;

a second gate line being configured to receive a second gate drive signal generated by the gate drive chip; and a pixel unit, having:

a first capacitance coupled to the first gate line;

a second capacitance coupled to the second gate line;

a first thin film transistor (TFT) coupled to the first gate line;

a second TFT coupled to the first gate line;

a first pixel area, being coupled to the first capacitance and the first TFT and operatively coupled to the first gate line via the first capacitance and the first TFT individually, and being configured to generate a first feed through (FT) voltage; and a second pixel area, being coupled to the second capacitance and the second TFT and operatively coupled to the first and the second gate lines via the second TFT and the second capacitance respectively, and being configured to generate a second FT voltage;

wherein the first and the second FT voltages are adjusted to be different values according to the first and the second gate drive signal.

2. The pixel structure of claim 1, wherein the display apparatus has a source drive chip operatively coupled to the pixel structure, and wherein when the source drive chip outputs a first polarity data signal to the pixel structure, the first gate drive signal adjusts the first FT voltage through the first TFT and the first capacitance, and adjusts the second FT voltage through the second TFT, so that the first FT voltage is larger than the second FT voltage.

3. The pixel structure of claim 2, wherein when the source drive chip outputs a second polarity signal to the pixel structure, the first gate drive signal adjusts the first FT voltage through the first TFT and the first capacitance, and adjusts the second FT voltage through the second TFT, and the second gate drive signal adjusts the second FT voltage through the second capacitance, so that the second FT voltage is larger than the first FT voltage.

4. The pixel structure of claim 3, wherein phases of the first and the second polarity data signals are mutually opposite.

5. The pixel structure of claim 1, wherein a capacitance value of the first capacitance is less than that of the second capacitance.

6. A drive method for use in the pixel structure as claimed in claim 1, comprising the following steps of:

enabling the first gate line according to the first gate drive signal when the display apparatus displays a first frame of an image, so that the first FT voltage is larger than the second FT voltage; and enabling the first and the second gate line at the same time according to the first and the second gate drive signals when the display apparatus displays a second frame of the image, so that the second FT voltage is lager than the first FT voltage.

7. The drive method of claim 6, further comprising the following steps of:

outputting a first polarity data signal; and displaying the first frame of the image according to the first polarity data signal.

8. The drive method of claim 7, further comprising the following steps of:

outputting a second polarity data signal; and displaying the second frame of the image according to the second polarity data signal.

9. The drive method of claim 8, wherein phases of the first and the second polarity data signals are mutually opposite.

10. A display apparatus, comprising:

a gate drive chip being configured to generate a first gate drive signal and a second gate drive signal;

a first gate line being configured to receive the first gate drive signal;

a second gate line being configured to receive the second gate drive signal;

a first pixel unit, having:

a first capacitance coupled to the first gate line;

a second capacitance coupled to the second gate line;

a first thin film transistor (TFT) coupled to the first gate line;

a second TFT coupled to the first gate line;

a first pixel area, being coupled to the first capacitance and the first TFT and operatively coupled to the first gate line via the first capacitance and the first TFT individually, and being configured to generate a first FT voltage; and a second pixel area, being coupled to the second capacitance and the second TFT and operatively coupled to the first and the second gate lines via the second TFT and the second capacitance respectively, being configured to generate a second FT voltage; and a second pixel unit, having:

a third capacitance coupled to the second gate line;

a fourth capacitance coupled to the first gate line;

a third TFT coupled to the first gate line;

a fourth TFT coupled to the first gate line;

a third pixel area, being coupled to the third capacitance and the third TFT and operatively coupled to the first and the second gate lines via the third TFT and the third capacitance respectively, being configured to generate a third FT voltage; and a fourth pixel area, being coupled to the fourth capacitance and the fourth TFT and operatively coupled to the first gate line via the fourth capacitance and the fourth TFT individually, being configured to generate a fourth voltage;

wherein the first and the second FT voltages are adjusted to be different values according to the first and the second gate drive signals, and the third and the fourth FT voltages are adjusted to be different values according to the same.

11. The display apparatus of claim 10, further comprising a source drive chip coupled to the first and the second pixel units, wherein when the source drive chip outputs a first and a second polarity data signals to the first and the second pixel units respectively, the first gate drive signal adjusts the first FT voltage through the first TFT and the first capacitance, and adjusts the second FT voltage through the second TFT, so that the first FT voltage is larger than the second FT voltage, the first gate drive signal adjusts the third FT voltage through the third TFT, and adjusts the fourth FT voltage through the fourth TFT and the fourth capacitance, so that the fourth FT voltage is larger than the third FT voltage.

12. The display apparatus of claim 11, wherein when the source drive chip outputs the first and the second polarity data signals to the second and the first pixel units respectively, the first gate drive signal adjusts the first FT voltage through the first TFT and the first capacitance, and adjusts the second FT voltage by the second TFT, the second gate drive signal adjusts the second FT voltage through the second capacitance, so that the second FT voltage is larger than the first FT voltage, the first gate drive signal adjusts the third FT voltage through the third TFT, the second gate drive signal adjusts the third FT voltage through the third capacitance, and the first gate drive signal adjusts the fourth FT voltage through the fourth TFT and the fourth capacitance, so that the third FT voltage is larger than the fourth FT voltage.

13. The display apparatus of claim 12, wherein phases of the first and the second polarity data signals are mutually opposite.

14. The display apparatus of claim 12, wherein the source drive chip comprises a gamma value storage unit being configured to store a first positive polarity gamma value, a first negative polarity gamma value, a second positive polarity gamma value, and a second negative polarity gamma value, when the source drive chip outputs the first and the second polarity data signals to the first and the second pixel units respectively, the first polarity data signal is inputted to the first pixel unit according to the first positive polarity gamma value, the second polarity data signal is inputted to the second pixel unit according to the second negative polarity gamma value, so that the first FT voltage equals to the third FT voltage and the second FT voltage equals to the fourth FT voltage.

15. The display apparatus of claim 14, wherein when the source drive chip outputs the first and the second polarity data signals to the second and the first pixel units respectively, the first polarity data signal is inputted to the second pixel unit according to the second positive polarity gamma value, the second polarity data signal is inputted to the first pixel unit according to the first negative polarity gamma value, so that the first FT voltage equals to the third FT voltage and the second FT voltage equals to the fourth FT voltage.

16. The display apparatus of claim 10, wherein a capacitance value of the first capacitance is less than that of the second capacitance, and a capacitance value of the fourth capacitance is less than that of the third capacitance.

17. A drive method for use in the display apparatus as claimed in claim 10, comprising the following steps of:

enabling the first gate line according to the first gate drive signal when the display apparatus displays a first frame of an image, so that the first FT voltage is larger than the second FT voltage and the fourth FT voltage is larger than the third FT voltage; and enabling the first and the second gate lines at the same time according to the first and the second gate drive signals when the display apparatus displays a second frame of the image, so that the second FT voltage is larger than the first FT voltage and the third FT voltage is larger than the fourth FT voltage.

18. The drive method of claim 17, further comprising the following steps of:

outputting a first and a second polarity data signals;

wherein the first frame of the image is displayed via the first polarity data signal received by the first pixel unit and the second polarity data signal received by the second pixel unit.

19. The drive method of claim 18, wherein phases of the first and the second polarity data signals are mutually opposite.

20. The drive method of claim 17, further comprising the following steps of:

outputting a first and a second polarity data signals;

wherein the second frame of the image is displayed via the first polarity data signal received by the second unit and the second polarity data signal received by the first polarity data signal.

21. The drive method of claim 20, wherein phases of the first and the second polarity data signals are mutually opposite.

* * * * *